(12) United States Patent
Jung et al.

(10) Patent No.: US 11,641,249 B2
(45) Date of Patent: May 2, 2023

(54) METHOD AND APPARATUS FOR DETERMINING A DURATION OF A REPETITION OF A TRANSPORT BLOCK

(71) Applicant: Lenovo (Singapore) Pte. Ltd., New Tech Park (SG)

(72) Inventors: Hyejung Jung, Northbrook, IL (US); Vijay Nangia, Woodridge, IL (US); Hossein Bagheri, Urbana, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 74 days.

(21) Appl. No.: 16/826,164

(22) Filed: Mar. 20, 2020

(65) Prior Publication Data

US 2020/0313793 A1 Oct. 1, 2020

Related U.S. Application Data

(60) Provisional application No. 62/823,491, filed on Mar. 25, 2019.

(51) Int. Cl.
*H04L 1/08* (2006.01)
*H04L 1/00* (2006.01)
*H04L 5/00* (2006.01)
*H04L 5/14* (2006.01)

(52) U.S. Cl.
CPC .......... *H04L 1/0013* (2013.01); *H04L 5/0007* (2013.01); *H04L 5/0042* (2013.01); *H04L 5/0044* (2013.01); *H04L 5/0094* (2013.01); *H04L 5/1469* (2013.01)

(58) Field of Classification Search
None
See application file for complete search history.

(56) References Cited

U.S. PATENT DOCUMENTS

| 2019/0223205 A1* | 7/2019 | Papasakellariou ........ H04L 5/00 |
| 2020/0267756 A1* | 8/2020 | Fakoorian ........... H04L 27/2607 |
| 2021/0045110 A1* | 2/2021 | Froberg Olsson ........ H04L 1/08 |
| 2021/0091890 A1* | 3/2021 | Ren ........................... H04L 5/00 |

OTHER PUBLICATIONS

3GPP, RAN1 Chairman's Notes, 3GPP TSG RAN WG1 Meeting Ad-Hoc Meeting 1901, Taipei, Taiwan, Jan. 21-25, 2019.
Ericsson, PUSCH enhancements for NR URLLC, R1-1901595, 3GPP TSG RAN WG1 Meeting #96, Athens, Greece, Feb. 25-Mar. 1, 2019.

(Continued)

*Primary Examiner* — Brandon M Renner
(74) *Attorney, Agent, or Firm* — Loppnow & Chapa; Matthew C. Loppnow

(57) ABSTRACT

DCI can be received. The DCI can include scheduling information for a physical channel carrying a TB. The physical channel can include a plurality of repetitions of the TB. The physical channel can span at least one slot. Each of the plurality of repetitions can be within a slot of the at least one slot. At least one repetition of the plurality of the repetitions can have a different duration than a duration of at least one other repetition of the plurality of the repetitions. A repetition duration of each of the plurality of repetitions can be determined based on a plurality of available symbols for the physical channel. The plurality of available symbols can be determined based on the DCI.

20 Claims, 6 Drawing Sheets

(56) References Cited

OTHER PUBLICATIONS

3GPP, 3rd Generation Partnership Project; Technical Specification Group Radio Access Network; NR; Multiplexing and channel coding (Release 15), 3GPP TS 38.212 V15.4.0 (Dec. 2018), Valbonne—France.

3GPP, 3rd Generation Partnership Project; Technical Specification Group Radio Access Network; NR; Physical layer procedures for control (Release 15), 3GPP TS 38.213 V15.4.0 (Dec. 2018), Valbonne—France.

3GPP, 3rd Generation Partnership Project; Technical Specification Group Radio Access Network; NR; Physical layer procedures for data (Release 15), 3GPP TS 38.214 V15.4.0 (Dec. 2018), Valbonne—France.

3GPP, 3rd Generation Partnership Project; Technical Specification Group Radio Access Network; NR; Radio Resource Control (RRC) protocol specification (Release 15), 3GPP TS 38.331 V15.4.0 (Dec. 2018), Valbonne—France.

D'Alessandro, International Search Report, International Application No. PCT/IB2020/052659, European Patent Office, Rijswijk, NL, dated Jun. 2, 2020.

Catt: "On PUSCH enhancements for URLLC", 3GPP Draft; R1-1902004 on PUSCH Enhancements for URLLC, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 25, 2019-Mar. 1, 2019 Feb. 16, 2019.

Nokia et al: "Summary of Friday offlinendiscussion on potential enhancements for PUSCH for NR URLLC (AI 7.2.6.1.3)", 3GPP Draft; R1-1903797 Summary of Friday Offline Discussion on 7.2.6.1.3_URLLC PUSCH ENH, 3rd Generation Partnership Project (3GPP), Mobile Competence Centre ; 650, Route Des Lucioles ; F-06921 Sophia vol. RAN WG1, No. Athens, Greece Feb. 25, 2019-Mar. 1, 2019 Mar. 3, 2019.

ETRI: "Potential enhancements to PUSCH", 3GPP Draft; R1-1902443 Potential Enhancements to PUSCH—Final, 3rd Generation Partnership Project (3GPP), Mobile Competence Centre ; 650, Route Des Lucioles ; F-06921 Sophia-Antipolis Cedex; France vol. RAN WG1, No. Athens, Greece; Feb. 25, 2019-Mar. 1, 2019 Feb. 16, 2019.

Motorola Mobility et al: "PUSCH enhancement for URLLC", 3GPP Draft; R1-1904931 PUSCH Enhancement for URLLC, 3rd Generation Partnership Project (3GPP), Mobile Competence Centre ; 650, Route Des Lucioles ; F-06921 Sophia-Antipolis Cedex ; France, vol. RAN WG1, No. Xi' an, China; Apr. 8, 2019-Apr. 12, 2019 Apr. 3, 2019.

Institute for Information Industry (III): "Discussion on Configured Grant Enhancements", 3GPP Draft; R1-1902931 Discussion on Configured Grant Enhancements, 3rd Generation Partnership Project (3GPP), Mobile Competence Centre ; 650, Route Des Lucioles ; F-06921 Sophia-Antipolis Cedex; FRA, vol. RAN WG1, No. Athens, Greece; Feb. 25, 2019-Mar. 1, 2019 Feb. 16, 2019.

* cited by examiner

METHOD AND APPARATUS FOR DETERMINING A DURATION OF A REPETITION OF A TRANSPORT BLOCK

BACKGROUND

1. Field

The present disclosure is directed to a method and apparatus for determining a duration of a repetition of a Transport Block (TB) communicated on a wireless wide area network.

2. Introduction

Presently, wireless communication devices, such as User Equipment (UE), communicate with other communication devices using wireless signals. For enhancement of Ultra-Reliable Low-Latency Communication (URLLC) in 3rd Generation Partnership Project (3GPP) Release (Rel)-16 New Radio (NR), flexible repetitions of a TB in Physical Uplink Shared Channel (PUSCH) based on a single uplink grant is currently being considered. Compared to a slot aggregation feature in 3GPP Rel-15 NR, where a UE performs repeated TB transmissions with different redundancy versions on the same set of symbols of multiple slots mainly for coverage enhancement, the TB repetition schemes for URLLC should be able to accommodate both reliability enhancement and latency reduction.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide for enhanced data channels for URLLC. According to a possible embodiment, Downlink Control Information (DCI) can be received. The DCI can include scheduling information for a physical channel carrying a TB. The physical channel can include a plurality of repetitions of the TB. The physical channel can span at least one slot. Each of the plurality of repetitions can be within a slot of the at least one slot. At least one repetition of the plurality of the repetitions can have a different duration than a duration of at least one other repetition of the plurality of the repetitions. A repetition duration of each of the plurality of repetitions can be determined based on a plurality of available symbols for the physical channel. The plurality of available symbols can be determined based on the DCI.

Figure 1:
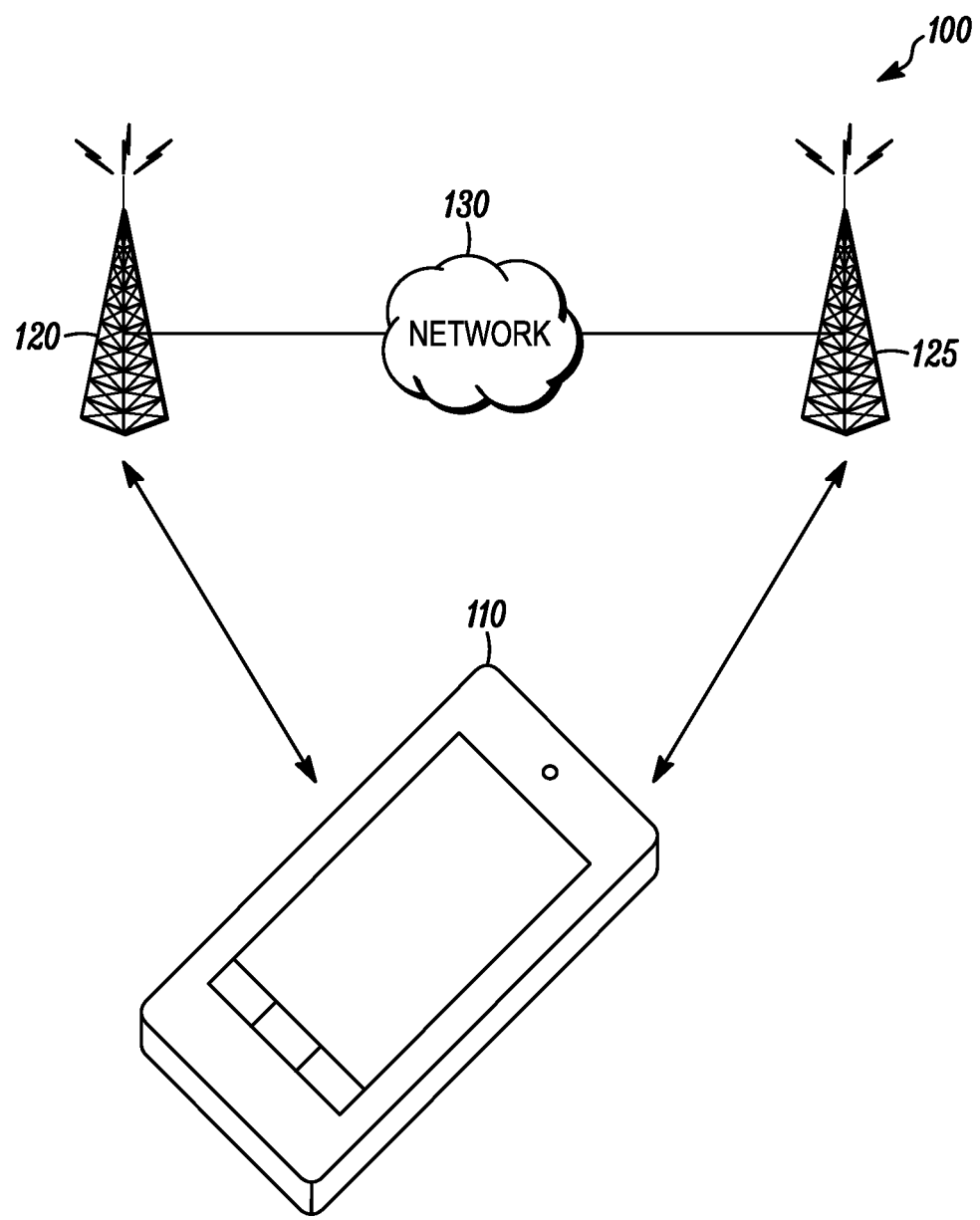
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network point, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

Different options can be used for URLLC TB repetition. According to a possible option, at least for scheduled PUSCH, one UL grant can schedule two or more PUSCH repetitions that can be in one slot, or across a slot boundary in consecutive available slots, which can also be called mini-slot based repetitions. This option can include, time domain resource determination, where the time domain resource assignment field in the DCI can indicate the resource for the first repetition. The time domain resources for the remaining repetitions can be derived based at least on the resources for the first repetition and the UL/DL direction of the symbols. Different methods can handle the detailed interaction with the procedure of UL/DL direction determination. Each repetition can occupy contiguous symbols. Different methods can determine whether and how to handle orphan symbols, such as when the number of UL symbols is not sufficient to carry one full repetition. This option can also include frequency hopping of at least two hops and can support at least inter-PUSCH-repetition hopping and inter-slot hopping. Different methods can handle other frequency hopping schemes. Different methods can handle numbers of hops larger than two. Different methods can handle dynamic indication of the number of repetitions. Different methods can handle DMRS sharing. Different methods can handle Transport Block Size (TB S) determination, such as based on the whole duration, or based on the first repetition.

According to another possible option for one UL grant scheduling two or more PUSCH repetitions in consecutive available slots, with one repetition in each slot with possibly different starting symbols and/or durations, which can also be called multi-segment transmission, for URLLC TB repetition, at least for scheduled PUSCH. This option can include time domain resource determination. The time domain resource assignment field in the DCI can indicate the starting symbol and the transmission duration of all the repetitions. Different methods can handle multiple Start and Length Indicators (SLIVs) indicating the starting symbol and the duration of each repetition. Different methods can handle details of SLIV, including the possibility of modifying SLIV to support the cases with S+L>14. Different methods can handle the interaction with the procedure of UL/DL direction determination. For the transmission within one slot, if there are more than one UL period within a slot, where each UL period can be the duration of a set of contiguous symbols within a slot for potential UL transmission as determined by the UE, one repetition can be within one UL period. Each repetition can occupy contiguous symbols. Otherwise, a single PUSCH repetition is transmitted within a slot following Rel-15 behavior. Different methods can handle the cases where more than one UL period is used for the transmission. At least inter-slot frequency hopping and other frequency hopping schemes can be supported. Different methods can handle TBS determination, such as based on the whole duration, or based on the first repetition, overhead assumption.

For the above two TB repetition options, such as schemes, for PUSCH as respectively known as mini-slot based repetition and multi-segment transmission, both of the options can have similar open issues on how to determine a TBS with balancing between latency and demodulation performance and how to determine available UL symbols for PUSCH repetition in TDD systems.

At least some embodiments can provide methods to determine available symbols for an enhanced PUSCH/PDSCH supporting time-domain TB repetition, both for mini-slot based repetition and multi-segment transmission. At least some embodiments can also provide methods to determine a TBS of the enhanced PUSCH/PDSCH.

Different URLLC use cases, such as power distribution, factory automation, and transport industry, can have different data packet sizes, such as 32, 250, 4096, and 10 K bytes, and can require different latency requirements, such as 1 ms, 2-3 ms, and/or 6-7 ms air interface delay. In order for a network entity and/or a UE to be able to handle URLLC packets of various sizes efficiently, PUSCH/PDSCH repetition schemes for URLLC traffics can support various ranges of TBSs without causing scheduling limitation and/or demodulation performance degradation. Furthermore, the PUSCH/PDSCH repetition schemes can allow the network entity to flexibly choose transmission parameters, such as a minimum required transmission duration for a self-decodable codeword and/or a starting symbol of PUSCH/PDSCH within a slot, with balancing trade-off between latency and reliability depending on Quality of Service (QoS) requirements. A slot can be a time-domain resource unit comprising of 14 Orthogonal Frequency Division Multiplexing (OFDM) symbols in 3GPP NR.

In Rel-15 3GPP NR, a TBS for PUSCH/PDSCH can be determined based on a number of allocated Physical Resource Blocks (PRBs), a number of symbols of PUSCH allocation within a slot, Demodulation Reference Signal (DM-RS) overhead, higher-layer configured overhead, an indicated Modulation and Coding Scheme (MCS), and a number of layers, taking into account Transport Block (TB)-Cyclic Redundancy Code (CRC) and Code Block (CB)-CRC.

Mini-slot based PUSCH repetition, where a total number of assigned symbols for UL data transmission can be divided for multiple transmission occasions of a smaller number of symbols with higher modulation order and coding rate, may lead to performance degradation due to selection of a base graph of Low-Density Parity-Check (LDPC) code with a higher mother code rate, shorter consecutive reads from the circular buffer, and accordingly, suboptimal selection of coded bits from the circular buffer. On the other hand, if a TBS and MCS is determined based on the entire duration of the PUSCH transmission, then a receiver may not be able to decode until receiving all channel bits for a TB or max codeword size, which will increase the latency.

In Rel-15 NR, for a configured UL grant, if a UE is not configured to monitor a dynamic Slot Format Indicator (SFI), then the UE can use the higher layer configured UL and flexible symbols for configured grant PUSCH transmission. If the UE is configured to monitor dynamic SFI, the UE can transmit on the higher layer configured UL symbols as well as the higher layer configured flexible symbols that are dynamically indicated as UL. Dynamic SFI carried by group common PDCCH may not meet high reliability requirement, such as 99.9999%, for URLLC services.

At least some embodiments can provide for definition of available symbols for PUSCH transmission or PDSCH reception.

In enhanced URLLC, an enhanced PUSCH/PDSCH for carrying at least one TB can include a plurality of UE's transmission (or reception) occasions and can span one or more slots. Each of the plurality of transmission (or reception) occasions can be within a slot and can comprise one or more contiguous symbols. Each of the plurality of transmission (or reception) occasions can have the same or different transmission (or reception) duration depending on a starting symbol of a transmission (or reception) occasion within a slot and available UL/DL symbols within the slot.

In the enhanced PDSCH, a reception occasion can include non-contiguous DL symbols due to pre-emption by higher-priority DL channels and reference signals, such as SS/PBCH blocks. In one example, the pre-emption by higher-priority DL channels and reference signals can be on a subset of the allocated Resource Blocks (RBs)/Resource Block Groups (RBGs)/Precoder Resource Groups (PRGs), while the other allocated resources on the DL symbols with pre-emption can be used for PDSCH reception. For the enhanced PUSCH transmission (or PDSCH reception) in unpaired spectrum, if some of allocated symbols are used for DL (or UL) communication and are not available, a UE can start a new transmission (or reception) occasion of the PUSCH (or PDSCH) following the DL (or UL) region with potentially new or not pre-determined initial phase offset.

According to a possible embodiment, a transmission (or reception) occasion of the enhanced PUSCH/PDSCH may not map across higher priority-PUCCH resources configured for low-latency HARQ-ACK feedback or low-latency Scheduling Request (SR) and/or configured higher-priority PUSCH resources.

Both in paired spectrum, such as Frequency Division Duplex (FDD), and in unpaired spectrum, such as TDD, the UE may need to support low-latency HARQ-ACK feedback transmission in response to reception of URLLC PDSCH and transmission of URLLC PUSCH, such as the enhanced PUSCH comprising multiple transmission occasions for transport block repetition, simultaneously. In UL, transmitting two UL channels with different frequency-domain resource allocations simultaneously by a UE may not be effective due to potential intermodulation and resulting Power Amplifier (PA) output power backoff. Thus, if the enhanced PUSCH overlaps with another higher-priority UL channel, such as PUCCH for low latency HARQ-ACK feedback/SR or the highest-priority configured grant PUSCH resource, in the time-domain and if the UE did not have enough processing time to multiplex low latency HARQ-ACK feedback/SR in the PUSCH, the UE may have to stop PUSCH transmission and potentially resume PUSCH transmission after completing transmission of higher priority UL channels. Since the enhanced PUSCH also needs to be protected to meet the reliability requirement, puncturing a part of a transmission occasion of the enhanced PUSCH that overlaps with other higher priority UL channels in time may not be efficient. Furthermore, due to PA power setting change during transmission of another UL channel, such as with a different transmission power or different frequency allocation, phase discontinuity can occur and accordingly, starting a new transmission occasion of the enhanced PUSCH, such as comprising its self-contained DM-RS, can be used.

According to a possible embodiment, OFDM or precoded OFDM, such as SC-FDMA, symbols of the enhanced PUSCH, such as URLLC PUSCH with TB repetition, that overlap in time-domain with other higher priority UL channels, such as PUCCH resources configured for URLLC HARQ-ACK feedback or higher-priority configured PUSCH resources, can be opportunistically used for the enhanced PUSCH. In one example, if the UE determines that the UE would not transmit on a configured higher-priority PUCCH and/or PUSCH resource, the UE can extend the enhanced PUSCH transmission occasion up to or to include the PUSCH symbols that overlap in time with the configured higher-priority PUCCH and/or PUSCH resource by transmitting the additional channel bits on the time-overlapped enhanced PUSCH symbols. In another example, a network entity, such as a gNB, can indicate in UL scheduling DCI whether to extend the enhanced PUSCH transmission occasion up to or to include the enhanced PUSCH symbols that overlap in time with the configured PUCCH/PUSCH resource. If the time-overlapped enhanced PUSCH symbols are allocated for other users or other signals/channels, the network entity can indicate to the UE not to transmit on the time-overlapped enhanced PUSCH symbols.

In one implementation, two or more transmission (or reception) occasions of the PUSCH (or PDSCH) included in a slot of the one or more slots can be non-contiguous in time. That is, more than one transmission (or reception) occasion can occur within a slot, only if there is a gap between any two transmission (or reception) occasions. The gap can be unavailable time-domain resources, such as DL symbols for the PUSCH or UL symbols for the PDSCH, reserved symbols, higher priority-PUCCH resources configured for low-latency HARQ-ACK feedback or low-latency SR, and/or configured higher-priority PUSCH resources. This implementation can be used for URLLC applications with large packet sizes, such as 1 Kbyte or larger, since a transmission (or reception) occasion can last up to a slot duration as long as there are no unavailable symbols in the slot. In another implementation, two or more transmission (or reception) occasions of the PUSCH (or PDSCH) in a slot of the one or more slots can occur on contiguous symbols without a gap. This implementation can be used for URLLC applications with small packet sizes, such as 32 bytes, and/or tight latency requirements, such as 1 ms air interface latency, for example, when the TBS and/or code rate is determined such that most of transmission (or reception) occasions are self-decodable.

At least some embodiments can provide for determination of a TBS.

According to a possible embodiment, a UE can receive information of time domain resource allocation, such as a starting time, an ending time, and/or a duration, for an enhanced PUSCH (or PDSCH) supporting TB repetition in the time domain.

In a first example, the time-domain resource allocation can include information of the duration for a time interval between a first time instance when the PUSCH transmission or PDSCH reception starts and a second time instance when the PUSCH transmission or PDSCH reception ends, where the UE may not transmit the PUSCH or receive the PDSCH during the entire time interval. For example, the UE may not transmit the PUSCH or receive the PDSCH because some symbols within the time interval can be unavailable symbols, where the UE does not transmit.

In a second example, the time-domain resource allocation can include information of the total duration during which the actual PUSCH transmission or PDSCH reception occurs.

In a third example, the time-domain resource allocation can include information of a nominal duration of a transmission (or reception) occasion. In one implementation, the nominal duration may not be zero. In one implementation, the nominal duration can be the duration of the first transmission (or reception) occasion.

The UE can determine a starting/ending time and a duration for each of the plurality of transmission (or reception) occasions in the PUSCH (or PDSCH), based on the received information of time-domain resource allocation, based on the slot boundary timing information, based on DL/UL configuration and slot format information in unpaired spectrum, based on higher-priority PUSCH resource configuration information, and/or based on higher-priority-PUCCH resource configuration information. The starting/ending time can be in terms of a starting/ending slot and a starting/ending symbol within the starting/ending slot.

Figure 2:
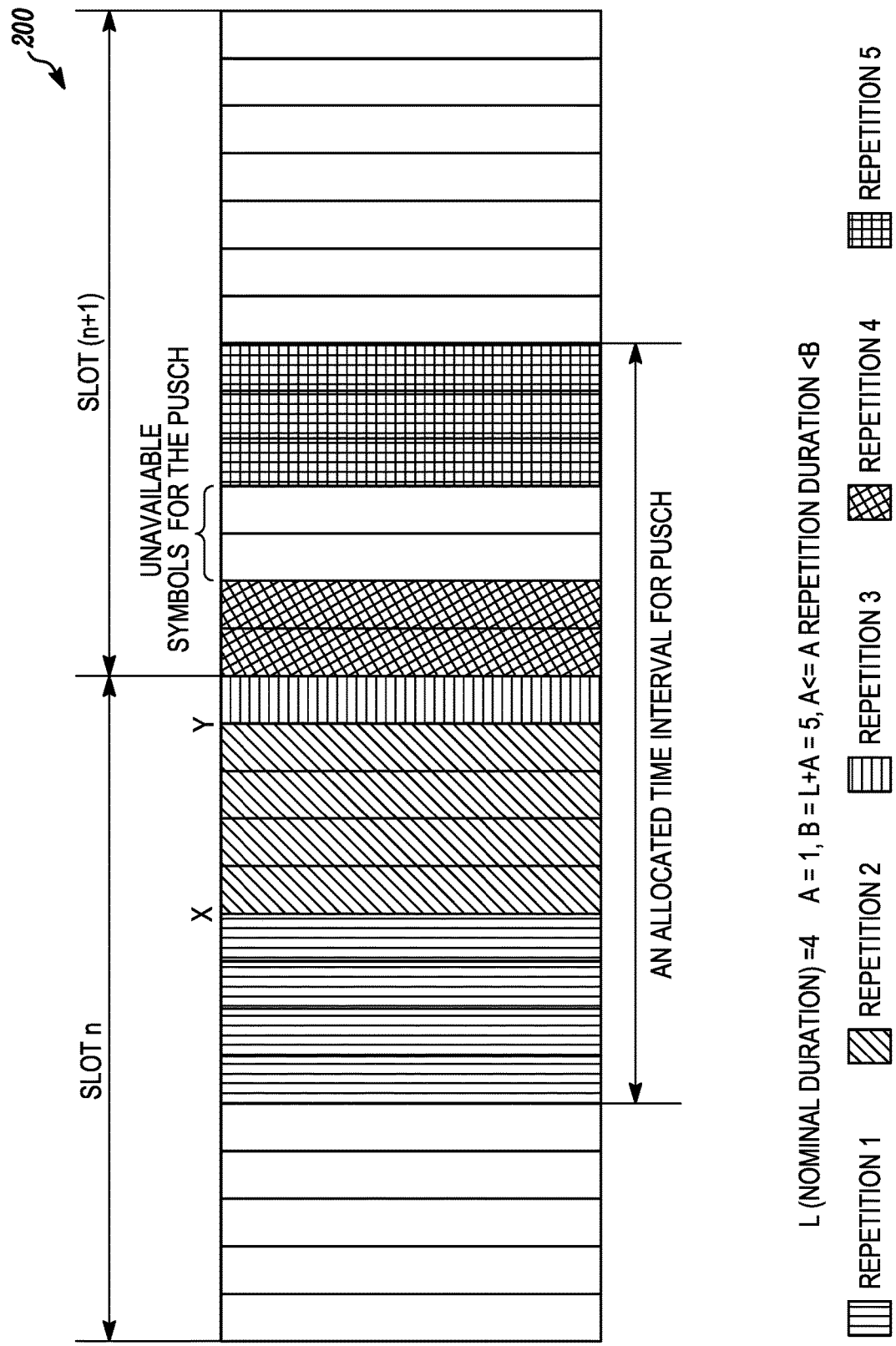
FIG. 2 is an example illustration of repetitions in slots according to a possible embodiment.

FIG. 2 is an example illustration 200 of repetitions in slots according to a possible embodiment. In the above first and second examples, one transmission (or reception) occasion in a slot of the one or more slots where the PUSCH (or PDSCH) spans can be determined such that a starting symbol, denoted as symbol X, can be the earliest available symbol for the PUSCH (or PDSCH) in the slot that does not belong to a previous transmission (or reception) occasion of the PUSCH (or PDSCH) and an ending symbol, denoted as symbol Y, can be the last symbol of contiguous available symbols for the PUSCH (or PDSCH) starting from the symbol X in the slot. In the above third example, a starting symbol, such as symbol X, of one transmission (or reception) occasion in a slot can be the earliest available symbol for the PUSCH (or PDSCH) in the slot that does not belong to a previous transmission (or reception) occasion of the PUSCH (or PDSCH), and an ending symbol, such as symbol Y, can be the last symbol of a subset of contiguous available symbols for the PUSCH (or PDSCH) starting from the symbol X. All the symbols in the subset of the contiguous available symbols can be contiguous, and the first symbol of the subset can be symbol X. The number of symbols in the subset of the contiguous available symbols may not be less than a value A but can be less than a value B, where the value B can be the sum of the nominal duration in terms of number of symbols and the value A. That is, if a number of the remaining contiguous available symbols following the nominal duration in the contiguous available symbols for the PUSCH (or PDSCH) starting from the symbol Xis less than the value A, the remaining contiguous available symbols in addition to the nominal duration can be included in the transmission (or reception) occasion. Otherwise, a new transmission (or reception) occasion can be formed from the remaining contiguous available symbols. The value A can be dependent on the nominal duration. In one implementation, the allowed set of value pairs '(nominal duration, A)' can be predefined or higher-layer configured. In another implementation, the value A can be separately configured, dynamically signaled, or predefined.

In a related embodiment, one PDSCH repetition out of multiple PDSCH repetitions of a TB can be a reception occasion. A reception occasion for PDSCH may not have any unavailable symbol, but can have one or more symbols leading to a number of unavailable resource elements/blocks that is more than a threshold. In one example, the value A can be dependent on one or more of the nominal durations of a PDSCH repetition, the number of unavailable Resource Elements (REs)/RBs, and the number of allocated RBs via scheduling assignment scheduling the PDSCH. In one example, the number of unavailable REs/RBs may not be a total number of unavailable REs/RBs, but can be determined based on a fraction of unavailable REs/RBs, such as based on the Control Resource Set (CORESET) rate-matched around the PDSCH. In another example, unavailable resources can include pre-empted resources, such as determined based on a pre-emption indication.

In one example, the number of PUSCH (or PDSCH) transmission occasions within a contiguous set of available symbols can be determined based on dividing (floor) the number of symbols in the set by the nominal duration, such as the indicated nominal duration, with the last or first PUSCH (or PDSCH) transmission occasion being larger, such as more symbols than the nominal duration, including the remaining contiguous available symbols within a contiguous set of available symbols. For example, with a nominal duration of 4 symbols, and 9 contiguous available symbols, there can be floor(9/4)=2 PUSCH (or PDSCH) transmission occasions with the first PUSCH (or PDSCH) transmission occasions duration of 4 symbols, and the second PUSCH (or PDSCH) transmission occasions duration of 5 symbols. In another example, the first PUSCH (or PDSCH) transmission occasions can be a duration of 5 symbols and the second PUSCH (or PDSCH) transmission occasions can be a duration of 4 symbols.

The UE can determine a TBS for the enhanced PUSCH (or PDSCH), based on the determined durations for the plurality of transmission (or reception) occasions of the enhanced PUSCH (or PDSCH). In one example, the UE can determine the TBS based on an average transmission (or reception) occasion duration, such as in terms of a number of OFDM or SC-FDMA symbols, or a median transmission (or reception) occasion duration from the durations of the plurality of transmission (or reception) occasions of the PUSCH (or PDSCH). These methods can allow the UE to transmit/receive self-decodable channel bits in most of transmission (or reception) occasions if the plurality of transmission (or reception) occasions have similar durations.

In another example, the UE can determine the TBS based on the maximum transmission (or reception) occasion duration from the durations of the plurality of transmission (or reception) occasions of the PUSCH (or PDSCH). Under a given target data rate, such as similar TBS for a given PUSCH (or PDSCH), this method can allow a gNB to schedule a lower MCS for the PUSCH (or PDSCH) and exploit the coding gain. Under a given MCS, the method can allow a gNB to schedule a larger TBS with less or no limitation in frequency domain resource allocation. In yet another example, the UE can determine the TBS based on the minimum transmission (or reception) occasion duration from the durations of the plurality of transmission (or reception) occasions of the PUSCH (or PDSCH). This method can guarantee the UE to transmit/receive self-decodable channel bits in all transmission (or reception) occasions even when the plurality of transmission (or reception) occasions have large variations in terms of their durations.

In another example, the UE can determine the TBS based on the nominal duration of PUSCH (or PDSCH) transmission (or reception) occasion. In yet another example, the UE can determine the TBS based on the duration of the first PUSCH (or PDSCH) transmission (or reception) occasion.

In other examples, DCI scheduling the enhanced PUSCH (or PDSCH) can indicate which method the UE should apply to determine the TBS, for example, by using 2-bit indication, such as 00: average of the durations, 01: median of the durations, 10: maximum duration, and 11: minimum duration. The gNB can choose a proper method for TBS determination based on the knowledge of available time-frequency resources and scheduling priority in a cell, latency requirements of on-going traffics, UE's buffer status report, and other information. Optionally, a set of allowed numbers of OFDM/SC-FDMA symbols for TBS determination can be higher-layer configured, and the UE can select one value in terms of a number of OFDM symbols for TBS determination based on the durations of the plurality of transmission (or reception) occasions and the indicated or configured TBS determination method.

In one example, the DCI scheduling the enhanced PUSCH (or PDSCH) can indicate the number of OFDM/SC-FDMA symbols for TBS determination from among the set of allowed numbers of OFDM/SC-FDMA symbols for TBS determination that are higher-layer configured. In one example, the TBS determination method can be Radio Resource Control (RRC) configured, at least for URLLC traffic. URLLC traffic can be identified by, for example, if the scheduling DCI has an Radio Network Temporary Identifier (RNTI) such as MCS-Cell (C)-RNTI or if the DCI has a priority/service indicator field indicating a URLLC/high priority service, or by an indication from higher layers, such as Medium Access Control (MAC), indicating a logical channel with URLLC/high priority service is multiplexed on the MAC Protocol Data Unit (PDU) that is to be transmitted on the PUSCH (or PDSCH). In one implementation, the TBS determination method can be configured as part of PUSCH (or PDSCH) configuration.

In another example, the TBS determination method can be determined based on one or more of determined duration of transmission (or reception) occasions and/or number of transmission (or reception) occasions.

In one example, the TBS determination method can be selected based on the Redundancy Version (RV) sequence used for PDSCH/PUSCH repetitions. Given, RV0 and RV3 can be self-decodable, in an example, a first TBS determination scheme that helps in self-decodability of each PDSCH/PUSCH repetition can be selected if the PDSCH repetitions use only RV0 and RV3. Otherwise, a second TBS determination scheme can be used, such as a maximum instead of a minimum/average described above. With self-decodability, the UE can determine the TBS based on the minimum transmission (or reception) occasion duration from the durations of the plurality of transmission (or reception) occasions of the PUSCH (or PDSCH). In another example, the TBS can be determined based on the duration of one or more of PDSCH/PUSCH repetitions with a first set of RVs, such as RV0 or RV3.

In one example, if the dissimilarity between the number of symbols or time-frequency resources of determined duration of transmission (or reception) occasions is smaller/not larger than a threshold, a first TBS determination method can be used. Otherwise a second TBS determination method can be used. The threshold can be pre-defined, or signaled via higher layer or a DCI, such as a scheduling DCI. In another example, if the dissimilarity between hypothetical TBSs calculated for different determined durations of transmission (or reception) occasions is smaller/not larger than a threshold, a first TBS determination method can be used. Otherwise a second TBS determination method can be used, such as where each calculated hypothetical TBS is calculated assuming a single transmission (or reception) occasion with its determined duration. In another example, the dissimilarity criteria can be based on one or more of number of layers, code rate, and MCS used for each transmission occasion.

In one example, different MCS and/or different number of layers, and/or different number of resources, such as REs/RBs, can be used for different transmission occasions, such as a first transmission occasion from a first TRP and a second transmission occasion from a first TRP. The first transmission occasion and the second transmission occasion can be associated with the same TB.

In one example, the TBS of the transport block can be determined based on the minimum of the hypothetical TBSs, such as a minimum of the intermediate number of information bits ($N_{info}$) as described in Technical Specification (TS) 38.214, calculated for the first transmission occasion and the second transmission occasion. In one example, the TBS of the transport block can be determined based on parameters associated with the first transmission occasion only.

According to another possible embodiment, if multiple Transmission Configuration Indicator (TCI) states or multiple Sounding Reference Signal (SRS) Resource Indices (SRIs) are configured or indicated for the enhanced PDSCH or PUSCH, respectively, then the TBS can be determined such that each transmission (or reception) occasion is self-decodable.

A PDCCH scheduling the enhanced PDSCH/PUSCH can include one or more TCI(s) or SRI(s) for determining PDSCH/PUSCH antenna port quasi co-location. The TCI can indicate one of the higher layer TCI-State configurations, down-selected by a MAC CE TCI state activation command, in the scheduled component carrier or DL Bandwidth Part (BWP) configuring a quasi-collocation relationship between one or more reference DL reference signals and the DM-RS ports of the PDSCH. The quasi co-location types can take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

At least some embodiments can provide for determination of UL or DL symbols for PUSCH and/or PDSCH.

Figure 3:
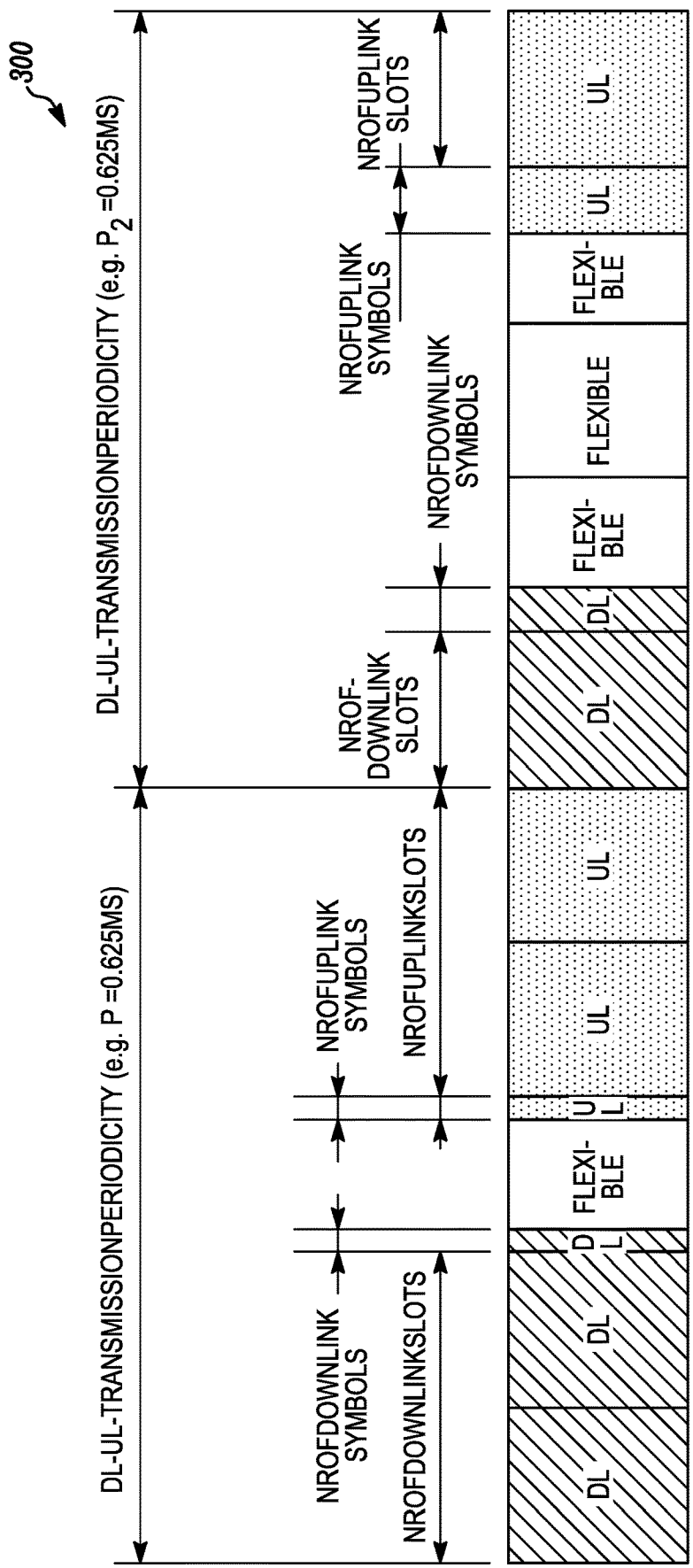
FIG. 3 is an example illustration of semi-static Time Division Duplex (TDD) Uplink (UL)/Downlink (DL) configuration according to a possible embodiment.

FIG. 3 is an example illustration 300 of semi-static TDD UL/DL configuration according to a possible embodiment. For example, the illustration 300 can include pattern 1 and pattern 2 from a TDD UL/DL common configuration information element, such as TDD-UL-UL-ConfigurationCommon. In Rel-15 NR, for a set of symbols of a slot that are indicated as DL/UL via semi-static TDD DL/UL configuration, a UE may not expect to detect a DCI format 2_0 with an SFI-index field value indicating the set of symbols of the slot as UL/DL, respectively, or as flexible. Thus, a PUSCH can be transmitted on semi-statically configured UL symbols. In RRC configured flexible symbols, the UE, if configured to monitor DCI format 2_0, can determine whether to receive/transmit semi-statically configured DL/UL channels/signals based on a slot format indication via DCI format 2_0. For RRC configured flexible symbols, if the UE does not detect DCI format 2_0 providing a slot format for the slot, the UE may not receive/transmit semi-statically configured DL/UL channels/signals and the UL transmission can be cancelled as long as processing time requirement is met. In dynamically indicated flexible symbols, the UE can prioritize dynamically scheduled UL/DL channels/signals over semi-statically configured UL/DL channels/signals.

According to a possible embodiment, a UE can receive an indication of slot formats for RRC configured flexible slots/symbols in DCI scheduling an enhanced PUSCH (or PDSCH), DCI activating a configured grant enhanced PUSCH, and/or DCI activating a semi-persistently scheduled enhanced PDSCH. Dynamic slot-format indication based on DCI format 2_0, such as group-common DCI, may not meet URLLC reliability requirement. Also, in the enhanced PUSCH (or PDSCH), which is dynamically scheduled, semi-statically configured, or semi-persistently scheduled, only using semi-statically configured UL/DL regions for transmission (or reception) of the PUSCH (or PDSCH) may not provide enough resources to guarantee reliability or may take longer time to complete PUSCH transmission or PDSCH reception with required actual transmission (or reception) time. For example, multiple PUSCH (or PDSCH) transmission occasions may be needed.

To enhance the reliability of slot formation indication, according to a possible embodiment, dynamic slot format indication for slots including higher-layer configured flexible symbols can be included in the scheduling DCI and/or (re)-activation DCI of URLLC PDCCH, if resource allocation of the enhanced PUSCH (or PDSCH) includes the slots with higher-layer configured flexible symbols.

In a possible implementation, a subset of slot formats, with 2-4 bit indication in DCI, from the set of slot formats defined in 3GPP TS 38.213 can be allowed to be used, as shown in Table 1, which shows UIL (U), DL (D), and flexible (F) symbols. In one example, the slot format indexes corresponding to the subset of slot formats, from within which a slot format is selected and indicated in the dynamic slot format indication, can be configured by higher layers. In Table 1, the UE can be allowed to transmit the enhanced PUSCH on dynamically indicated UL and flexible symbols. For further reduction of DCI overhead, in other implementations, one slot format indicated in the scheduling DCI can be applicable to all flexible slots within the enhanced PUSCH (or PDSCH) duration. Flexible slots can be slots including the higher-layer configured flexible symbols and flexible symbols in a slot can take the same corresponding transmission direction U/D/F as that in the indicated slot format.

TABLE 1

Example: a subset of slot formats used for an enhanced PUSCH

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 1 | U | U | U | U | U | U | U | U | U | U | U | U | U | U |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 44 | D | D | D | D | D | F | F | F | F | F | F | F | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 54 | F | F | F | F | F | F | F | D | D | D | D | D | D | D |
| 55 | D | D | F | F | F | U | U | U | D | D | D | D | D | D |

According to another possible embodiment, the UE can be configured to monitor a DCI format of high-reliability dynamic Slot Format Indicator (SFI). If the UE is configured to monitor high reliability dynamic SFI, the UE can transmit on the higher layer configured UL symbols as well as the higher layer configured flexible symbols that are dynamically indicated as UL. If the UE is not configured to monitor high reliability SFI, the UE can use the higher layer configured UL and flexible symbols for configured grant PUSCH transmission.

According to a possible implementation, the DCI format of high-reliability dynamic SFI can have the same DCI field as the DCI format 2_0 of Rel-15 NR, but can be scrambled with a different RNTI than the Rel-15 NR Slot Format Indication (SFI)-RNTI. In another implementation, the DCI format of high-reliability dynamic SFI can be included in UE-specific PDCCH. The UE can determine available UL/DL symbols for the enhanced PUSCH (or PDSCH) supporting PUSCH (or PDSCH) repetition based on the detected high-reliability dynamic SFI. In one example, if a UE is configured to monitor a DCI format of high-reliability/low-latency PDSCH/PUSCH transmission, the DCI format can also include a high reliability dynamic SFI indication. In one implementation, such an inclusion can be possible if the UE is configured/capable of reception of dynamic SFI indication in the DCI format.

In Rel-16 NR and onward, a UE can be configured with PUSCH (or PDSCH) slot aggregation, such as a multi-slot PUSCH (or PDSCH) with the same symbol allocation in each slot, where the higher layer parameters pdsch-AggregationFactor and/or pdsch-AggregationFactor in 3GPP TS 38.331 can be configured. The UE can determine whether to perform TB repetition, how to perform TB repetition, and the number of TB repetitions based on a detected DCI format.

For example, if the detected DCI format is a newly defined, such as in Rel-16 NR and onward, DCI format or a DCI format scrambled by a newly defined, such as in Rel-16 NR and onward, RNTI for URLLC data, then the UE can perform TB repetition according to the enhanced TB repetition schemes. If the detected DCI format is a legacy, such as in Rel-15 NR, DCI format and/or scrambled with a legacy RNTI, such as a C-RNTI and/or MCS-C-RNTI, the UE can perform PUSCH (or PDSCH) slot aggregation with the same symbol allocation in each slot according to the Rel-15 NR specification.

In a first example embodiment, a UE can receive a scheduling assignment scheduling a number of PDSCH repetitions over a set of symbols. The UE can determine the number of unavailable REs over the set of symbols. The UE can determine a first set of boundary symbols corresponding to the PDSCH repetitions. The UE can determine a second set of boundary symbols corresponding to the PDSCH repetitions, where the set of boundary symbols determines the symbols associated with each of the PDSCH repetitions. The UE can determine a first set of number of unavailable REs for PDSCH repetitions based on the first set of boundary symbols. Each element of the first set of unavailable REs can be associated with each of the PDSCH repetitions. The UE can determine a second set of number of unavailable REs for PDSCH repetitions based on the second set of boundary symbols. Each element of the second set of unavailable REs can be associated with each of the PDSCH repetitions. The UE can determine a first distance parameter corresponding to the elements of the first set of a number of unavailable REs for PDSCH repetitions. The UE can determine a second distance parameter corresponding to the elements of the second set of a number of unavailable REs for PDSCH repetitions. The UE can decode the PDSCH repetitions according to the first set of boundary symbols corresponding to the PDSCH repetitions if the first distance parameter is smaller than the second distance parameter. Otherwise, the UE can decode the PDSCH repetitions according to the second set of boundary symbols corresponding to the PDSCH repetitions.

In an example related to the first example embodiment, the first/second distance parameter can measure the discrepancy of elements of the first/second set of number of unavailable REs for PDSCH repetitions. For instance, the first/second distance parameter can be the maximum difference between the first/second set of number of unavailable REs for PDSCH repetitions. For example, for a scheduling assignment, and four, such as four nominal, PDSCH repetitions, the first set of number of unavailable REs for PDSCH repetitions can be [100, 200, 120, 50], and the first distance parameter can be 200 (maximum of the first set of number of unavailable REs)−50 (minimum of the first set of number of unavailable REs)=150.

In a related second example embodiment, the number of unavailable REs can be determined at least based on a parameter indicated in the scheduling assignment, such as a rate matching indicator defined in DCI format 1-1 of TS 38.212. Additionally, or alternately, the number of unavailable REs can be determined at least based on the CORESET where the scheduled PDSCH is rate matched around.

In a third example embodiment related to the first example embodiment, instead of or in addition to using a distance parameter to determine whether to select the first or the second set of boundary symbols corresponding to the PDSCH repetitions, one or more of different criteria can be used. One criterion that can be used to determine whether to select the first or the second set of boundary symbols corresponding to the PDSCH repetitions can be a PDSCH repetition index amongst the PDSCH repetitions. Another criterion that can be used to determine whether to select the first or the second set of boundary symbols corresponding to the PDSCH repetitions can be the starting symbol index of the first PDSCH repetition. Another criterion that can be used to determine whether to select the first or the second set of boundary symbols corresponding to the PDSCH repetitions can be a TBS number determined for each PDSCH repetition assuming a first/second set of boundary symbols corresponding to the PDSCH repetitions.

In a fourth example embodiment related to the first example embodiment, the first and the second set of boundary symbols corresponding to the PDSCH repetitions can be determined based on a higher layer indication such as RRC signaling.

Figure 4:
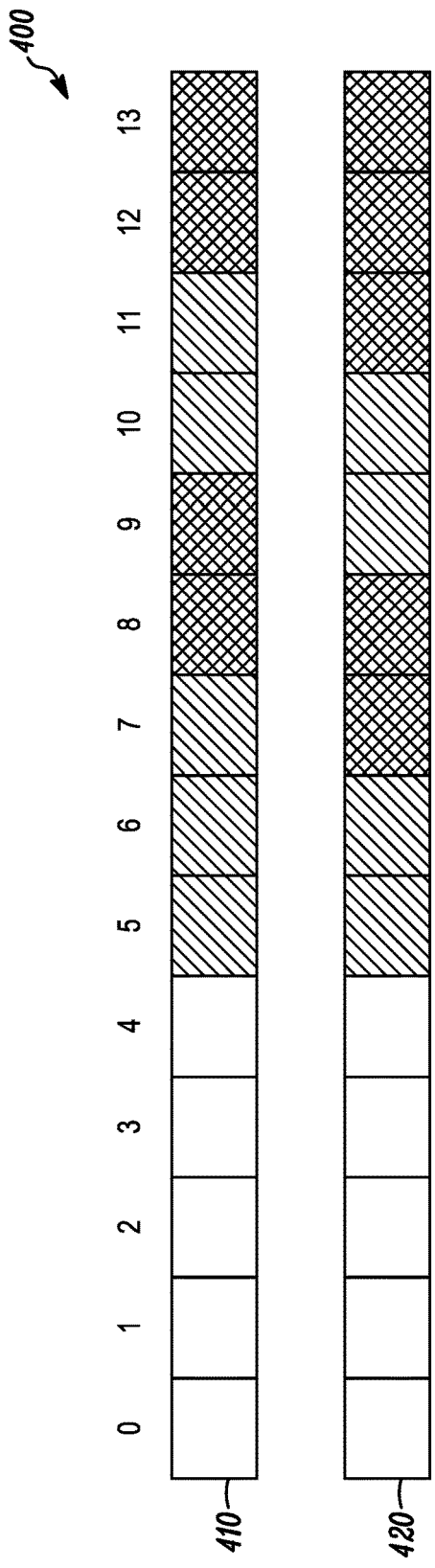
FIG. 4 is an example illustration of symbol boundaries for four Physical Downlink Shared Channel (PDSCH) repetitions according to a possible embodiment.

FIG. 4 is an example illustration 400 of symbol boundaries for four PDSCH repetitions according to a possible embodiment. The top symbols 410 can show [3,2,2,2]. The bottom symbols 420 can show [2,2,2,3]. Each shading can show one PDSCH repetition. In this example, the UE can be scheduled with four PDSCH repetitions, where each PDSCH repetition can have a nominal duration of two OFDM symbols. If the first PDSCH repetition starts at the $6^{th}$ symbol of a 14-symbol slot, the first set of boundary symbols corresponding to the PDSCH repetitions can be determined based on a first configuration, such as [3,2,2,2], and the second set of boundary symbols corresponding to the PDSCH repetitions can be determined based on a second configuration, such as [2,2,2,3].

Figure 5:
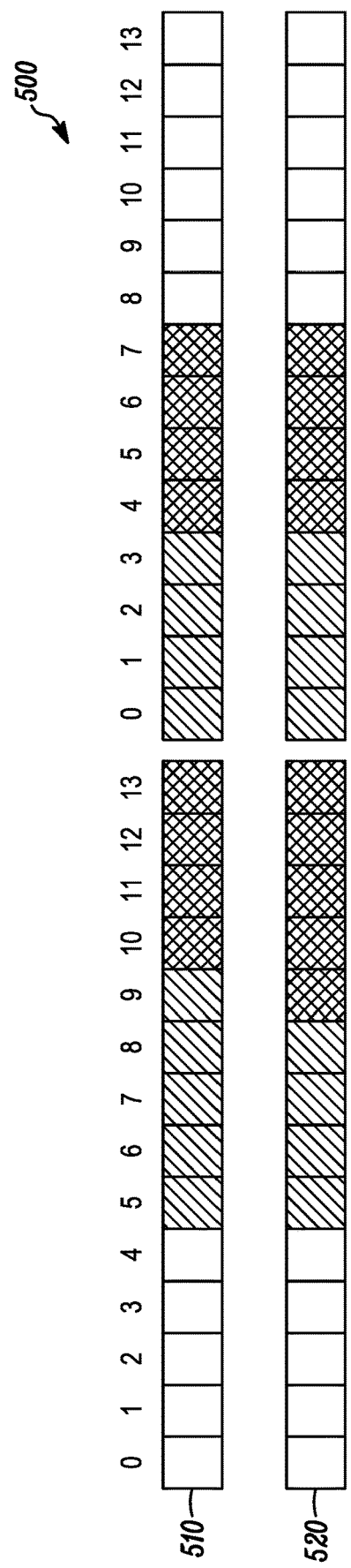
FIG. 5 is an example illustration of symbol boundaries for four PDSCH repetitions with 4-symbol nominal PDSCH duration according to a possible embodiment.

FIG. 5 is an example illustration 500 of symbol boundaries for four PDSCH repetitions with 4-symbol nominal PDSCH duration according to a possible embodiment. The top symbols 510 can show [5,4,4,4] and the bottom symbols 520 can show [4,5,4,4]. Each shading can show one PDSCH repetition. Each slot can contain 14 symbols. In this example, the UE can be scheduled with four PDSCH repetitions, where each PDSCH repetition can have a nominal duration of four OFDM symbols. If the first PDSCH repetition starts at the $6^{th}$ symbol of a 14-symbol slot, the first set of boundary symbols corresponding to the PDSCH repetitions can be determined based on a first configuration, such as [5,4,4,4], and the second set of boundary symbols corresponding to the PDSCH repetitions can be determined based on a second configuration, such as [4,5,4,4].

In another example, the UE can be scheduled with 4 PDSCH repetitions, where each PDSCH repetition can have a nominal duration of 2 OFDM symbols. If the first PDSCH repetition starts at the $6^{th}$ symbol of a 14-symbol slot, the fourth PDSCH repetition can include the last symbol of the slot, such as the $14^{th}$ symbol of the slot, as an additional symbol. For example, the last mini-slot/PDSCH repetition can be composed of three symbols instead of two symbols.

Figure 6:
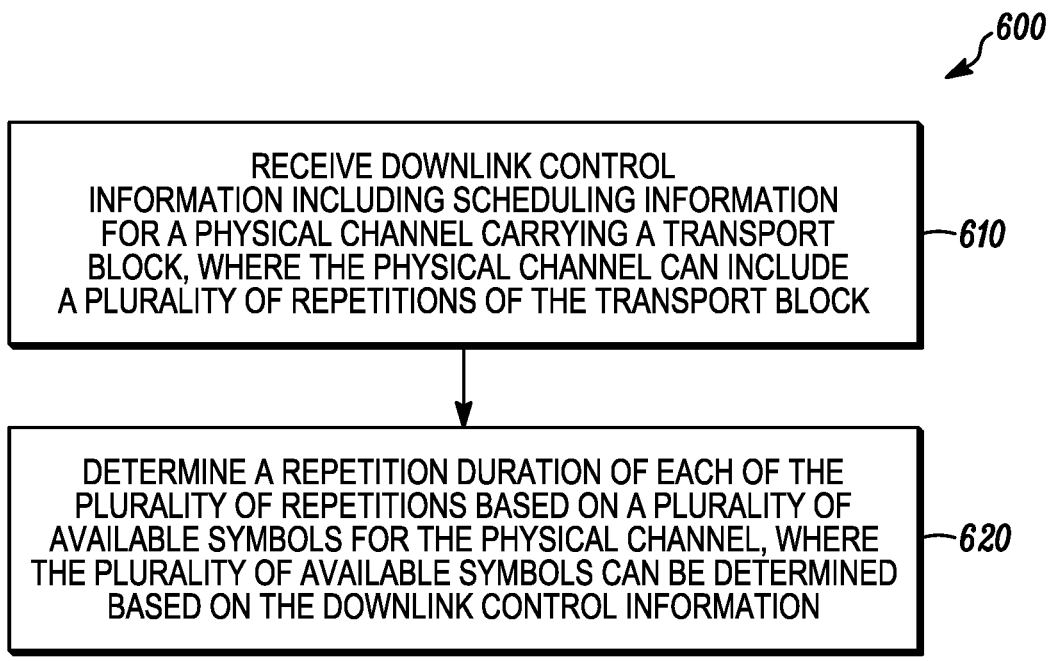
FIG. 6 is an example flowchart illustrating the operation of a wireless communication device according to a possible embodiment.

FIG. 6 is an example flowchart 600 illustrating the operation of a wireless communication device, such as the UE 110, according to a possible embodiment. At 610, DCI can be received. The DCI can include scheduling information for a physical channel carrying a TB. The physical channel can include a plurality of repetitions of the TB. A repetition of a TB can mean there is at least one actual transmission (or reception) of the TB. Furthermore, a repetition can be an initial transmission (or reception) of the TB, which in the art can be considered a repetition despite being the initial transmission (or reception) of the TB. The physical channel can span at least one slot.

Each of the plurality of repetitions can be within a slot of the at least one slot. Two consecutive repetitions of the plurality of repetitions included in a slot of the at least one slot can be non-contiguous in time where at least one unavailable symbol can exist between the two consecutive repetitions. Each of the plurality of repetitions can be on a consecutive set of symbols from the plurality of available symbols. According to a possible embodiment, each repetition of the plurality of repetitions can include at least one DM-RS symbol. At least one repetition of the plurality of the repetitions can have a different duration than a duration of at least one other repetition of the plurality of the repetitions.

At 620, a repetition duration of each of the plurality of repetitions can be determined based on a plurality of available symbols for the physical channel. The plurality of available symbols can be determined based on the DCI. According to a possible implementation, the UE can determine a repetition duration, and can transmit, for UL, or receive, for DL, the plurality of repetitions of the TB based on the determined repetition duration.

According to a possible embodiment, a configuration including information of a plurality of potentially unavailable symbols for the physical channel can be received via a higher-layer signaling. The higher-layer can be higher than a physical layer. The plurality of available symbols can be determined based on a semi-static configuration and the DCI. In one example, a UE can receive a subset of slot formats indicating at least one of UL, DL, and flexible symbols in the semi-static configuration, and can further receive a DCI field indicating a selection of a slot format selected from the subset of slot formats. In another example, the potentially unavailable symbols can be symbols configured for high-priority PUCCH/PUSCH higher than the physical channel and can be pre-empted resources.

According to a possible embodiment, the plurality of potentially unavailable symbols for the physical channel can include reserved resources, pre-empted resources, at least a part of semi-statically configured flexible symbols, and/or symbols configured for at least one high-priority physical channel higher than a priority of the physical channel. Flexible symbols can be symbols that are available for UL or DL transmissions.

According to a possible embodiment, the higher-layer configuration can include information of a set of allowed slot formats. The DCI can include an indication of a slot format of the set of allowed slot formats. The plurality of available symbols can be determined based on the indicated slot format.

According to a possible embodiment, at least one semi-static DL and UL configuration for a TDD operation can be received. According to a possible implementation, at least one semi-statically configured DL symbol configured via the at least one semi-static DL and UL configuration can be an unavailable symbol for the physical channel. The scheduling information can include an UL grant. The physical channel can be a PUSCH. According to another possible implementation, at least one semi-statically configured UL symbol configured via the at least one semi-static DL and UL configuration can be an unavailable symbol for the physical channel. The scheduling information can include a DL scheduling assignment. The physical channel can be a PDSCH.

According to a possible embodiment, the scheduling information can include an indication of a nominal duration of a repetition. The repetition duration of each of the plurality of repetitions can be determined based on the received indication of a nominal duration. For example, the repetition duration can be determined based on the nominal duration. The repetition duration of each of the plurality of repetitions can be less than or equal to the nominal duration. For example, this can be a case of the value A=1. A TB size for the physical channel can be determined based on the nominal duration.

According to a possible embodiment, the plurality of repetitions can include a first repetition and a second repetition. The first repetition can occur before the second repetition. A determination can be made as to whether to use a first set of repetition durations or a second set of repetition durations. The first set of repetition durations can include a first repetition duration and a second repetition duration. The second set of repetition durations can include a third repetition duration and a fourth repetition duration. In response to determining to use the first set of repetition durations, the TB can be decoded based on associating the first repetition duration with the first repetition and based on associating the second repetition duration with the second repetition. In response to determining to use the second set of repetition durations, the TB can be decoded based on associating the third repetition duration with the first repetition and based on associating the fourth repetition duration with the second repetition.

According to a possible embodiment, determining whether to use the first set of repetition durations or the second set of repetition durations can be based on a starting symbol of the first repetition.

According to another possible embodiment, a first set of a first number of unavailable REs corresponding to the first set of repetition durations can be determined. A set of unavailable REs can include resources pre-empted by a pre-emption indication and/or resources indicated by a rate-matching indicator. A second set of a second number of unavailable REs corresponding to the second set of repetition durations can be determined. Determining whether to use the first set of repetition durations or the second set of repetition durations can be based on the first set of the first number of unavailable REs and the second set of the second number of unavailable REs.

According to another possible embodiment, a TB size for the physical channel can be determined based on the determined repetition durations of each of the plurality of repetitions. A respective redundancy version can be determined for each of the plurality of repetitions. A TB size for the physical channel can be determined based on the determined repetition durations of the plurality of repetitions and the determined respective redundancy version for each of the plurality of repetitions.

Figure 7:
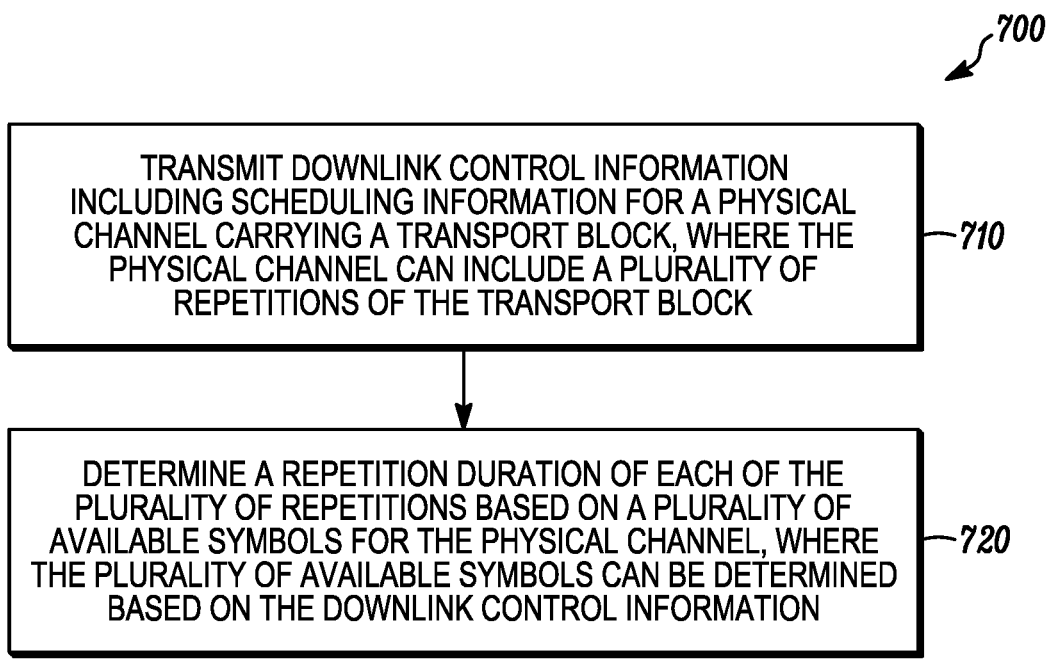
FIG. 7 is an example flowchart illustrating the operation of a network entity according to a possible embodiment.

FIG. 7 is an example flowchart 700 illustrating the operation of a network entity, such as the network entity 120, according to a possible embodiment. At 710, DCI can be transmitted. The DCI can include scheduling information for a physical channel carrying a TB. The physical channel can include a plurality of repetitions of the TB. The physical channel can span at least one slot. Each of the plurality of repetitions can be within a slot of the at least one slot. At least one repetition of the plurality of the repetitions can have a different duration than a duration of at least one other repetition of the plurality of the repetitions. At 720, a repetition duration of each of the plurality of repetitions can be determined based on a plurality of available symbols for the physical channel. The plurality of available symbols can be determined based on the DCI. Other operations can be performed, such as reciprocal and/or complementary operations to UE operations described in the flowchart 600 or in other embodiments.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
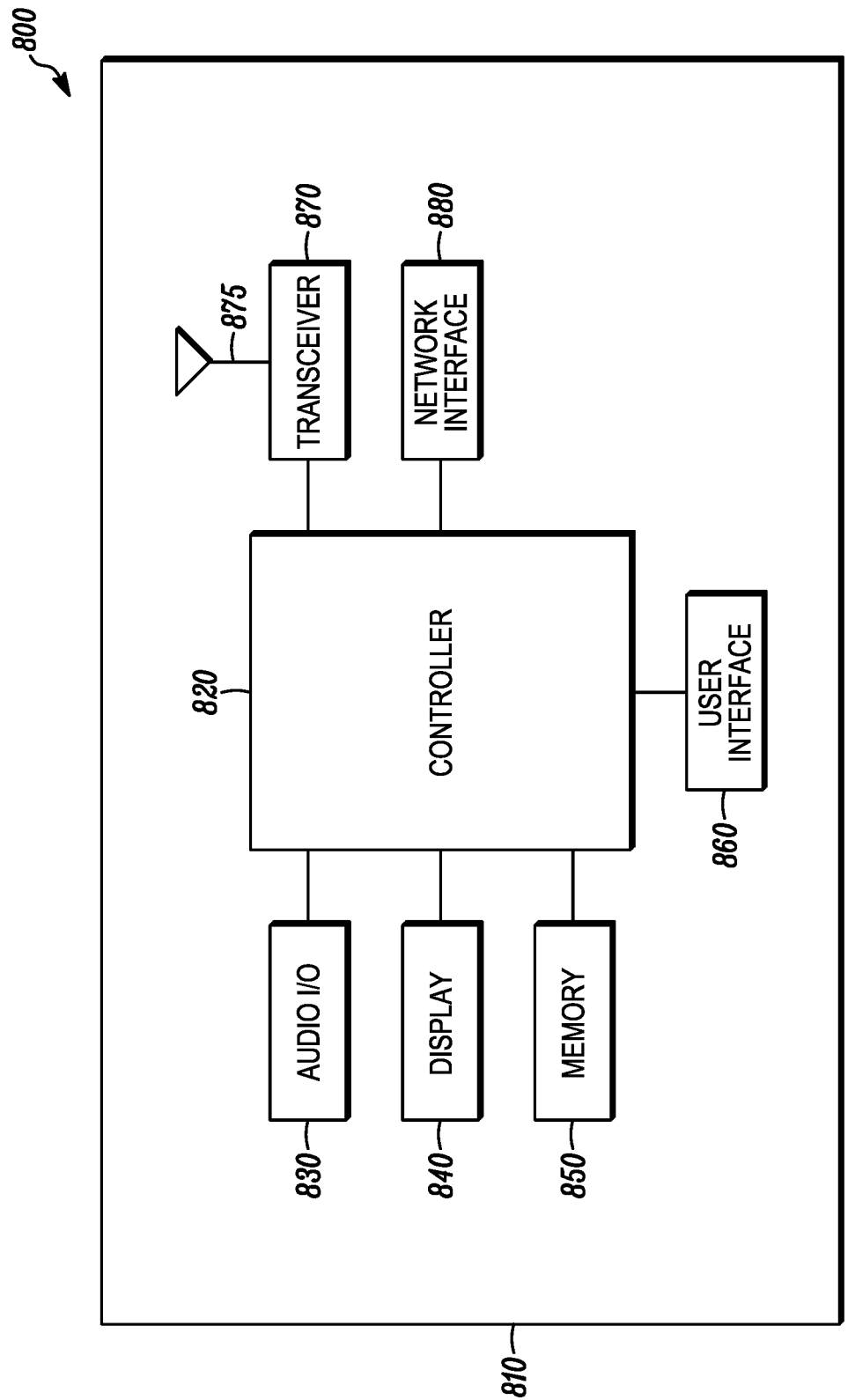
FIG. 8 is an example block diagram of an apparatus according to a possible embodiment.

FIG. 8 is an example block diagram of an apparatus 800, such as the UE 110, the network entity 120, or any other wireless communication device disclosed herein, according to a possible embodiment. The apparatus 800 can include a housing 810, a controller 820 coupled to the housing 810, audio input and output circuitry 830 coupled to the controller 820, a display 840 coupled to the controller 820, a memory 850 coupled to the controller 820, a user interface 860 coupled to the controller 820, a transceiver 870 coupled to the controller 820, at least one antenna 875 coupled to the transceiver 870, and a network interface 880 coupled to the controller 820. The apparatus 800 may not necessarily include all of the illustrated elements for different embodiments of the present disclosure. The apparatus 800 can perform the methods described in all the embodiments.

The display 840 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 870 can be one or more transceivers that can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 850 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 800 or the controller 820 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 850, elsewhere on the apparatus 800, in cloud storage, and/or anywhere else that can store software and/or an operating system. The apparatus 800 or the controller 820 may also use hardware to implement disclosed operations. For example, the controller 820 may be any programmable processor. Furthermore, the controller 820 may perform some or all of the disclosed operations. For example, at least some operations can be performed using cloud computing and the controller 820 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

In operation, the apparatus 800 can perform the methods and operations of the disclosed embodiments. The transceiver 870 can transmit and receive signals, including data signals and control signals that can include respective data and control information. The controller 820 can generate and process the transmitted and received signals and information.

The transceiver 870 can receive DCI including scheduling information for a physical channel carrying a TB. The physical channel can include a plurality of repetitions of the TB. The physical channel can span at least one slot. Each of the plurality of repetitions can be within a slot of the at least one slot. At least one repetition of the plurality of the repetitions can have a different duration than a duration of at least one other repetition of the plurality of the repetitions.

The controller 820 can determine a repetition duration of each of the plurality of repetitions based on a plurality of available symbols for the physical channel. The plurality of available symbols can be determined based on the DCI.

According to a possible embodiment, two consecutive repetitions of the plurality of repetitions included in a slot of the at least one slot can be non-contiguous in time where at least one unavailable symbol can exist between the two consecutive repetitions. According to a possible embodiment, each of the plurality of repetitions can be on a consecutive set of symbols from the plurality of available symbols. According to a possible embodiment, the transceiver 870 can receive a configuration including information of a plurality of potentially unavailable symbols for the physical channel via a higher-layer signaling. The higher-layer can be higher than a physical layer. The plurality of available symbols can be determined based on a semi-static configuration and the DCI. According to a possible embodiment, the scheduling information can include an indication of a nominal duration of a repetition.

At least some embodiments can provide for a transmission occasion of an enhanced PUSCH that supports time-domain TB repetition that does not map across higher priority UL channels, such as low-latency HARQ-ACK feedback/SR and/or configured higher-priority PUSCH resources. Symbols of the enhanced PUSCH that overlap in time with other higher priority UL channels can be opportunistically used for the enhanced PUSCH, depending on whether the UE would transmit time-overlapped higher priority UL channels.

At least some embodiments can provide for a TBS of an enhanced PUSCH (or PDSCH) that supports time-domain TB repetition that can flexibly be determined based on determined durations of a plurality of transmission (or reception) occasions in the enhanced PUSCH (or PDSCH). Further, a network entity can indicate a proper TBS determination method, depending on packet sizes and target latency.

At least some embodiments can provide for TDD slot format(s) in RRC configured flexible symbols that can be indicated in scheduling DCI of URLLC PUSCH (or PDSCH) that supports time-domain repetition, which may achieve the similar high reliability for slot format indication.

At least some embodiments can provide a method at a UE. The method can include receiving information of an UL grant for a PUSCH carrying a transport block. The PUSCH can include a plurality of transmission occasions and can span one or more slots. Each of the plurality of transmission occasions can be within a slot and at least one transmission occasion of the plurality of the transmission occasions can have a different transmission duration than a transmission duration of other transmission occasions of the plurality of the transmission occasions. The method can include determining a transmission duration of each of the plurality of transmission occasions. The method can include determining a TBS for the PUSCH based on the determined transmission durations of the plurality of transmission occasions. The method can include determining a demodulation reference signal.

According to a possible embodiment, the TBS for the PUSCH can be determined based on a longest transmission duration among the determined transmission durations of the plurality of transmission occasions.

According to a possible embodiment, the method can include receiving indication of a first duration to be used for determining a TBS that is different than a total transmission duration for the plurality of transmission occasions. The first duration may not be the same as any of the determined transmission durations of the plurality of transmission occasions.

According to a possible embodiment, two or more transmission occasions included in a slot of the one or more slots can be non-contiguous in time.

According to a possible embodiment, the method can include receiving an indication in the UL grant of a nominal duration of the transmission occasion. The method can include determining the transmission occasion duration of each of the plurality of transmission occasions based on the received indicated nominal duration. The transmission occasion duration of each of the plurality of transmission occasions can be at least the nominal duration.

According to a possible embodiment, the duration of the first transmission occasion of the plurality of transmission occasions can be the nominal duration. The TBS for the PUSCH can be determined based on the nominal duration.

According to a possible embodiment, the method can include receiving configuration by higher layers of a set numbers of OFDM/SC-FDMA symbols that can be used for TBS determination. The method can include receiving in the UL grant, an indication of a value from the set of numbers of OFDM/SC-FDMA symbols. The method can include determining the TB S for the PUSCH is determined based on the received indicated value.

According to a possible embodiment, the method can include receiving in the UL grant, a slot format indication. The method can include determining the transmission direction of the flexible symbols in a slot corresponding to a transmission occasion of the plurality of transmission occasions based on the received slot format indication in the UL grant. The method can include receiving configuration by higher layers of a subset of slot format indexes, where the slot format indication receiving in the UL grant can be one from the subset of slot format indexes.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure. For example, some embodiments relating to UL channels can be applicable to DL channels and some embodiments relating to DL channels can be applicable to UL channels.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a user equipment, the method comprising:
   receiving downlink control information including scheduling information for a physical channel carrying a transport block,
   where the scheduling information comprises information of a plurality of allocated symbols for the physical channel,
   where the downlink control information further comprises information of a plurality of available symbols within the plurality of allocated symbols,
   where the physical channel comprises a plurality of repetitions of the transport block,
   where the physical channel spans at least one slot,
   where each of the plurality of repetitions is within a slot of the at least one slot, and
   where at least one repetition of the plurality of the repetitions has a different duration than a duration of at least one other repetition of the plurality of the repetitions; and
   determining a repetition duration of each of the plurality of repetitions based on the plurality of available symbols for the physical channel,
   wherein all of the allocated symbols are not always available symbols.

2. The method according to claim 1, wherein two consecutive repetitions of the plurality of repetitions included in a slot of the at least one slot are non-contiguous in time where at least one unavailable symbol exists between the two consecutive repetitions.

3. The method according to claim 1, wherein each of the plurality of repetitions is on a consecutive set of symbols from the plurality of available symbols.

4. The method according to claim 1, further comprising receiving, via a higher-layer signaling, the higher-layer higher than a physical layer, a configuration including information of a plurality of potentially unavailable symbols for the physical channel, where the plurality of available symbols are determined based on the information of a plurality of potentially unavailable symbols and availability information for the plurality of potentially unavailable symbols in the downlink control information.

5. The method according to claim 4, wherein the plurality of potentially unavailable symbols for the physical channel comprise at least one of reserved resources, pre-empted resources, at least a part of semi-statically configured flexible symbols, and symbols configured for at least one high-priority physical channel higher than a priority of the physical channel, where flexible symbols are symbols that are available for uplink or downlink transmissions.

6. The method according to claim 4,
   wherein the higher-layer configuration includes information of a set of allowed slot formats,
   wherein the downlink control information includes an indication of a slot format of the set of allowed slot formats, and
   wherein the method further comprises determining the plurality of available symbols based on the indicated slot format.

7. The method according to claim 1, further comprising receiving at least one semi-static downlink and uplink configuration for a time division duplexing operation.

8. The method according to claim 7,
   wherein at least one semi-statically configured downlink symbol configured via the at least one semi-static downlink and uplink configuration is an unavailable symbol for the physical channel,
   wherein the scheduling information comprises an uplink grant, and
   wherein the physical channel is a physical uplink shared channel.

9. The method according to claim 7,
   wherein at least one semi-statically configured uplink symbol configured via the at least one semi-static downlink and uplink configuration is an unavailable symbol for the physical channel,
   wherein the scheduling information comprises a downlink scheduling assignment, and
   wherein the physical channel is a physical downlink shared channel.

10. The method according to claim 1, wherein the scheduling information includes an indication of a nominal duration of a repetition.

11. The method according to claim 10, wherein determining the repetition duration comprises determining the repetition duration of each of the plurality of repetitions based on the received indication of a nominal duration.

12. The method according to claim 11, wherein the repetition duration of each of the plurality of repetitions is less than or equal to the nominal duration.

13. The method according to claim 10, wherein a transport block size for the physical channel is determined based on the nominal duration.

14. The method according to claim 1, wherein each repetition of the plurality of repetitions includes at least one demodulation reference signal symbol.

15. The method according to claim 1,
wherein the plurality of repetitions comprises a first repetition and a second repetition,
wherein the first repetition occurs before the second repetition, and
wherein the method further comprises:
determining whether to use a first set of repetition durations or a second set of repetition durations, where the first set of repetition durations comprises a first repetition duration and a second repetition duration, and where the second set of repetition durations comprises a third repetition duration and a fourth repetition duration;
in response to determining to use the first set of repetition durations, decoding the first repetition based on the first repetition duration and based on the second repetition duration; and
in response to determining to use the second set of repetition durations, decoding the second repetition based on the third repetition duration and based on the fourth repetition duration.

16. An apparatus comprising:
a transceiver that receives downlink control information including scheduling information for a physical channel carrying a transport block,
where the scheduling information comprises information of a plurality of allocated symbols for the physical channel,
where the downlink control information further comprises information of a plurality of available symbols within the plurality of allocated symbols,
where the physical channel comprises a plurality of repetitions of the transport block,
where the physical channel spans at least one slot,
where each of the plurality of repetitions is within a slot of the at least one slot, and
where at least one repetition of the plurality of the repetitions has a different duration than a duration of at least one other repetition of the plurality of the repetitions; and
a controller coupled to the transceiver, where the controller determines a repetition duration of each of the plurality of repetitions based on the plurality of available symbols for the physical channel,
wherein all of the allocated symbols are not always available symbols.

17. The apparatus according to claim 16, wherein two consecutive repetitions of the plurality of repetitions included in a slot of the at least one slot are non-contiguous in time where at least one unavailable symbol exists between the two consecutive repetitions.

18. The apparatus according to claim 16, wherein each of the plurality of repetitions is on a consecutive set of symbols from the plurality of available symbols.

19. The apparatus according to claim 16,
wherein the transceiver receives, via a higher-layer signaling, the higher-layer higher than a physical layer, a configuration including information of a plurality of potentially unavailable symbols for the physical channel, and
wherein the controller determines the plurality of available symbols based on the information of a plurality of potentially unavailable symbols and availability information for the plurality of potentially unavailable symbols in the downlink control information.

20. The apparatus according to claim 16, wherein the scheduling information includes an indication of a nominal duration of a repetition.

* * * * *